No. 682,642. Patented Sept. 17, 1901.
J. SACHS.
MEANS FOR CONTROLLING ELECTRIC MOTOR VEHICLES.
(Application filed July 26, 1900.)
(No Model.) 2 Sheets—Sheet 1.
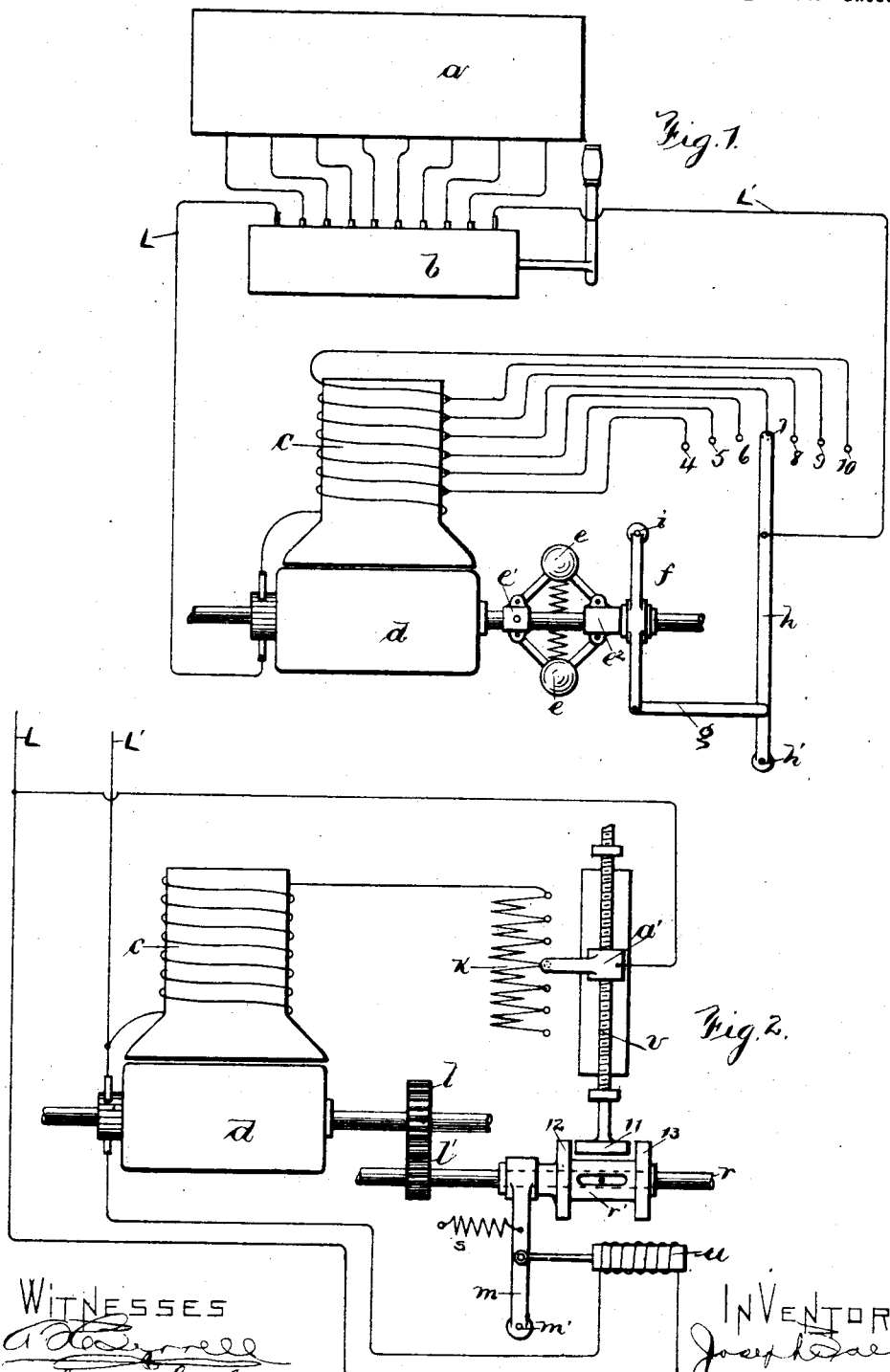

No. 682,642. Patented Sept. 17, 1901.
J. SACHS.
MEANS FOR CONTROLLING ELECTRIC MOTOR VEHICLES.
(Application filed July 26, 1900.)
(No Model.) 2 Sheets—Sheet 2.

Witnesses
Inventor
Joseph Sachs
per L. W. Serrell & Son
Attys

THE NORRIS PETERS CO., PHOTO-LITHO., WASHINGTON, D. C.

UNITED STATES PATENT OFFICE.

JOSEPH SACHS, OF HARTFORD, CONNECTICUT.

MEANS FOR CONTROLLING ELECTRIC-MOTOR VEHICLES.

SPECIFICATION forming part of Letters Patent No. 682,642, dated September 17, 1901.

Application filed July 26, 1900. Serial No. 24,870. (No model.)

*To all whom it may concern:*

Be it known that I, JOSEPH SACHS, a citizen of the United States, residing at Hartford, in the county of Hartford and State of Connecticut, have invented a new and useful Improvement in Methods of and Means for Controlling Electric-Motor Vehicles, of which the following is a specification.

My present invention relates to means for controlling the current delivered to an electric motor used in propelling motor-vehicles and similar conveyances or in driving machinery.

The storage batteries of the present storage-battery-motor vehicle are hampered by the fact that the battery discharge is constantly varying and at times far exceeds the discharge rate at which the battery may be advantageously run. This is caused by the demand of the motor for a varying current to supply the necessary torque output at the vehicle-wheels to keep them in motion under all conditions of travel, ascending grades and rough roads necessarily requiring greater torque output to keep the vehicle in motion than level and good roads. This variable discharge of the battery at rates which often exceed the efficient discharge rate shortens the life and reduces the total output capacity of the battery, because a storage battery will only operate efficiently when the rate of discharge is such that the chemical change in the plates is not excessive. It is therefore desirable in vehicles using storage batteries to limit the battery discharge to an economical rate, and so prolong the battery capacity.

The object of my invention is therefore to provide means automatically operated whereby a practically constant current is supplied to the motor from a battery or other source and at the same time provide means whereby automatically the motor can deliver a variable torque, said torque varying inversely as the speed of the motor.

Referring to the drawings, Figure 1 is an elevation and diagrammatic view of a means for accomplishing the objects of my present invention. Fig. 2 represents an equivalent form of the device. In Fig. 3 I have illustrated my invention as applied to a motor-vehicle. Figs. 4, 5, and 6 are modified forms of the device shown in Figs. 1 and 2, illustrating, respectively, a separately-excited motor-field, an armature loose upon its shaft, and an adjustable field-pole.

Referring to Fig. 1, $a$ represents a storage battery, and $b$ represents a controller; but neither of the above has any bearing on the present invention, they being shown simply to indicate a source of power and means for controlling the same. $d$ is a motor-armature, and $c$ the motor-field, which, as will be seen, is represented as series wound. The fields are wound in sections, successive sections being connected to cut-out terminals 4, 5, 6, 7, 8, 9, and 10, respectively. Upon the motor-shaft I employ a ball-governor $e$. One of the governor-sleeves $e'$ is pinned to the shaft. The other sleeve $e^2$ is loose upon the shaft and carries the lever-arm $f$, which is pivoted at end $i$. The lever $h$ is pivoted at $h'$, having on the opposite end a contact-piece adapted to bear upon any one of the cut-out terminals 5 to 10, inclusive. Levers $f$ and $h$ are connected by tie-rod $g$. I do not limit myself to these devices for contacting with the cut-out terminals, as other devices actuated by the governor may be equally operative and advantageous. In other words, any kind of motor may be employed and the field varied in any desirable way. It is well understood that the speed of any given electric motor varies directly as the impressed voltage at its terminals and inversely as the field strength; also, the torque delivered by said motor depends directly upon the current passing through the armature and the strength of the motor-fields.

To illustrate the device represented in Fig. 1, we will assume that the same is attached to a motor-vehicle and that said vehicle is running smoothly along a level road. Under these conditions it is assumed that the motor requires a certain definite current strength to deliver the necessary torque to propel the vehicle, said current strength not to exceed the efficient discharge rate of the battery. If now the vehicle comes to an ascending grade or obstruction requiring an increased torque output of the motor, the motor obviously demands an increase of current and slows down. At the same time the governorballs approach one another, thereby operating the lever $h$ through the rod $g$ and lever $f$ to throw in one or more sections of field-coils, and thus increase the field strength. It will thus be apparent that any demand upon the motor to deliver an increased torque is supplied at a practically constant current by an increased field strength and a decreased speed. When the vehicle comes again to an ordinary level road, the tendency is for the current supplied to the motor to decrease and the speed to increase, effecting the controlling device in the opposite way, cutting out one or more of the field-sections, weakening the field strength, and reducing the torque output of the motor, which now operates at an increased speed and bringing the current again to its efficient output rate. The motor is thus being operated at a practically constant energy output.

In Fig. 2 I have shown a shunt-wound motor. The lead L and L' coming from a suitable source of power, as shown in Fig. 1, relative motion is transmitted to the supplemental shaft $r$ from motor-shaft through gears $l$ and $l'$. Upon the shaft $r$ is a loose sleeve $r'$, having integral flanges 12 and 13. A lever $m$ is attached to one end of the sleeve $r$, said lever being pivoted at $m'$. A circular disk 11 is attached to the lower end of a screw-rod $v$ and the latter is actuated through the disk 11 by disk 11 coming in contact with either flange 12 or 13. The arm $a'$ is moved vertically by said feed-screw $v$ and is adapted to bear successively upon the terminals of rheostat $k$, which is in the field-circuit. A solenoid $u$ is in the main circuit and arranged to actuate the lever $m$. The operation of this and the preceding device is precisely similar. When a demand for increased torque is made upon the motor, the latter demands an increase of current. This increase of current in its initial stage, acting through the solenoid $u$, draws the lever $m$ over, and consequently the sleeve $r$, until flange 12 comes in contact with the disk 11. Said disk is then revolved and the arm $a'$ raised, whereby the resistance in the field-circuit is decreased and the field strength increased. Thus the additional torque required of the motor is supplied at a nearly constant current by an increase of field strength and decrease of speed, and vice versa.

Figure 5:
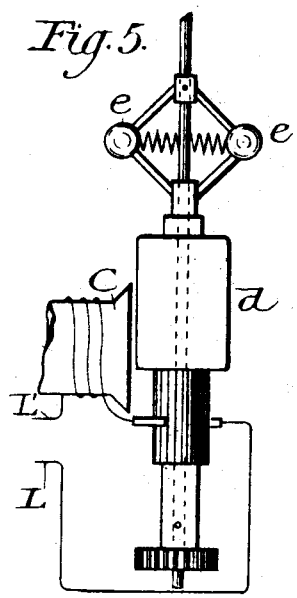
Fig. 5 illustrates a modification of my invention, wherein the motor-armature is loose upon its shaft and is coupled to the loose sleeve of governor $e$, whereby the armature is moved in and out of the magnetic field, according to a decrease or increase of motor speed. An increased torque is thus applied at a decreased speed and increased flux through the armature, and vice versa.
Figure 3:
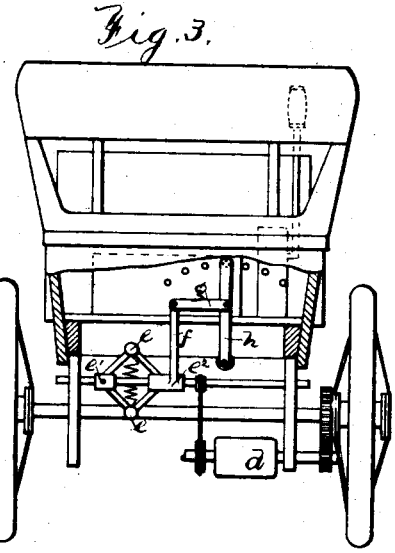
Figure 6:
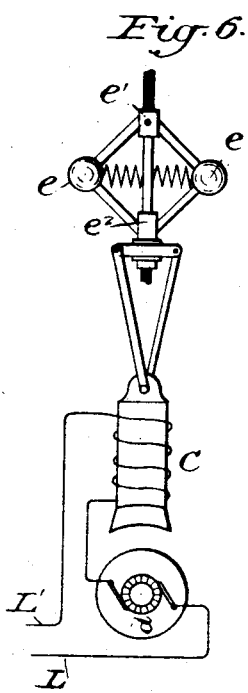
Fig. 6 is a modification of the means of varying the magnetic flux through the motor-armature by automatically increasing or decreasing the air-gap and producing the same effect as in the previous modification.
Figure 4:
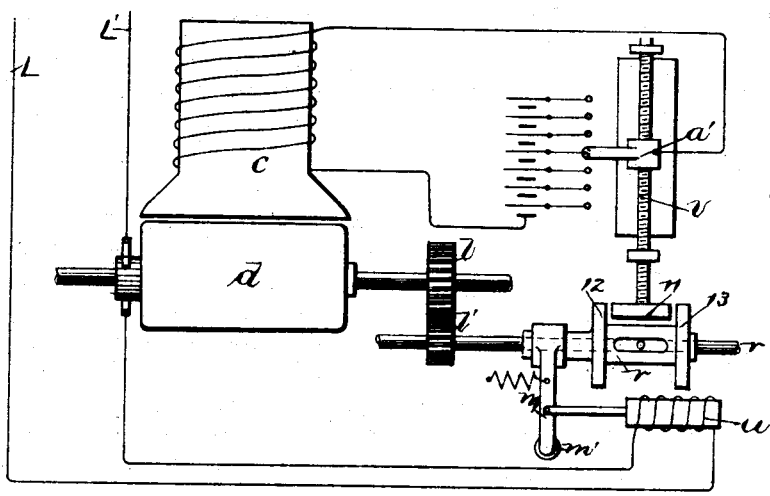
Fig. 4 is a variation of Fig. 2, wherein the motor-field is separately excited, the intensity of the field being varied by the same device, as shown in Fig. 2, said device throwing in or cutting out cells of the battery employed to excite the motor-field to increase or diminish the field strength, as the case may be.

It will be understood that in applying this invention to motor-vehicles it is essential to employ a motor of massive field, the fields being of heavier construction than is necessary for the operation of the motor under normal conditions on level roads.

I claim as my invention—

1. In an electric-motor-controlling system, the combination with a source of electric energy and the actuating-motor, of devices for automatically varying the field strength of the motor whereby, without an increased current-supply from the source of electric energy, any additional torque demanded of the motor is delivered at a decreased speed and vice versa, substantially as specified.

2. In an electric-motor-controlling device the combination with a source of electric energy and the actuating-motor, of a device automatically actuated by the motor-shaft and shifted by the variable speed thereof, for varying and so regulating the strength of the motor-field, whereby without an increased current-supply from the source of electric energy, any additional torque demanded of the motor is delivered at a decreased speed and vice versa, substantially as specified.

3. In an electric-motor-controlling device, the combination with a source of electric energy and the actuating-motor, of a device automatically actuated by variations in the current-supply to said motor, and devices automatically actuated by the motor-shaft and shifted by the variable speed thereof for varying and so regulating the strength of the motor-field, whereby without an increased current-supply from the source of electric energy, any additional torque demanded of the motor is delivered at a decreased speed and vice versa, substantially as specified.

4. In an electric-motor vehicle the combination with a source of electric energy and controller therefor, of an electric motor connected to the driving-axle of said vehicle and devices for automatically varying the field strength of the motor whereby, without an increased current-supply from the source of electric energy, any additional torque demanded of the motor is delivered at a decreased speed and vice versa, substantially as specified.

5. In an electric-motor vehicle, the combination with a source of electric energy and controller therefor, of a series motor whose field-coils are made in sections connected to the axle of said vehicle, of a governor on the shaft of such motor, of means connected to and operated by said governor and electric connections, whereby an increase or decrease of the torque demanded of said motor is automatically supplied, by a decrease or an increase of field strength and a decrease or an increase of speed, at a practically constant current-supply from the source of electric energy to motor, substantially as specified.

6. In an electric-motor vehicle, the combination with the source of electric energy and controller therefor, of an electric motor connected to the driving-axle of said vehicle, a centrifugal governor on the shaft of said motor, a series of cut-out terminals electrically connected to successive sections of the motor-fields and devices actuated by the varying speed movements of the governor for successively contacting with said terminals, whereby the field strength is increased or decreased to compensate for the varying torque demanded of the motor, substantially as specified.

7. In an electric-motor vehicle the combination with a source of electric energy and controller therefor, of an electric motor connected to an axle of said vehicle and devices which automatically vary the torque and speed of the motor without changing its output, with a constant current flow and fixed electromotive force at its terminals, substantially as specified.

8. In a system of electric-motor-vehicle control the combination with an electric motor and a source of electrical energy therefor, of devices for automatically varying the torque and speed of the motor inversely, without affecting either the motor's energy output, the potential at its brushes, or the current supplied thereto, substantially as described.

9. In a system of motor-control, the combination with an electric motor and a source of electrical energy, of devices for manually regulating the movement and speed of the motor, and devices for automatically effecting an inversely variable speed and torque in the motor at a given energy input, without changing either the motor's energy output, the potential at its brushes, or the current supplied thereto, substantially as set forth.

Signed by me this 23d day of July, 1900.

JOSEPH SACHS.

Witnesses:
GEO. T. PINCKNEY,
BERTHA M. ALLEN.